US 8,256,790 B2

(12) United States Patent
Fortner

(10) Patent No.: US 8,256,790 B2
(45) Date of Patent: Sep. 4, 2012

(54) ADJUSTABLE RECEIVER HITCH SYSTEM

(76) Inventor: William Olen Fortner, Gillette, WY (US)

( * ) Notice: Subject to any disclaimer, the term of this patent is extended or adjusted under 35 U.S.C. 154(b) by 0 days.

(21) Appl. No.: 13/108,234

(22) Filed: May 16, 2011

(65) Prior Publication Data
US 2011/0291384 A1 Dec. 1, 2011

Related U.S. Application Data

(60) Provisional application No. 61/348,544, filed on May 26, 2010.

(51) Int. Cl.
B60D 1/36 (2006.01)
(52) U.S. Cl. .................. 280/478.1; 280/490.1
(58) Field of Classification Search .............. 280/478.1, 280/479.2, 490.1, 477
See application file for complete search history.

(56) References Cited

U.S. PATENT DOCUMENTS

| 3,093,395 | A | | 6/1963 | Boutwell |
| 3,428,336 | A | | 2/1969 | Thurman |
| 4,662,647 | A | * | 5/1987 | Calvert ...................... 280/490.1 |
| 4,792,153 | A | | 12/1988 | Galdes |
| 4,944,525 | A | | 7/1990 | Landry |
| 4,951,957 | A | * | 8/1990 | Gullickson ............... 280/479.2 |
| 5,011,176 | A | | 4/1991 | Eppinette |
| 5,342,076 | A | | 8/1994 | Swindall |
| 5,547,210 | A | | 8/1996 | Dugger |
| D376,780 | S | * | 12/1996 | McCoy ........................ D12/162 |
| 5,727,805 | A | | 3/1998 | La Roque |
| 5,806,872 | A | | 9/1998 | Szczypski |
| 5,975,553 | A | * | 11/1999 | Van Vleet ..................... 280/483 |
| 6,902,181 | B1 | | 6/2005 | Dye |
| 7,909,350 | B1 | * | 3/2011 | Landry ....................... 280/479.2 |
| 2003/0218314 | A1 | | 11/2003 | Moss |

* cited by examiner

Primary Examiner — Tony Winner
(74) Attorney, Agent, or Firm — Morriss O'Bryant Compagni

(57) ABSTRACT

An adjustable receiver hitch system including a slide member that may be installed on a receiver tube attached to a vehicle, extending therethrough. Near the distal end of the slide member is disposed a rotationally pivotable bearing assembly. Interchangeable connection ends may be attached to the bearing assembly and are used to connect to a towed trailer. One interchangeable end may feature a height adjustment capability, while others may have fixed vertical heights. The system allows a user to adjust the attachment portion of the hitch in multiple ways to connect to a towed trailer to allow for attachment without an exact alignment between the primary vehicle and the trailer.

20 Claims, 5 Drawing Sheets

ADJUSTABLE RECEIVER HITCH SYSTEM

CROSS-REFERENCE TO RELATED APPLICATION

This application claims the benefit of U.S. Provisional Application No. 61/348,544, filed May 26, 2010, the disclosure of which is incorporated herein by reference in its entirety.

TECHNICAL HELD

The present invention relates to trailer hitch assemblies for receiver hitch systems.

BACKGROUND

A receiver hitch utilizes an insert secured in a tube at the rear of a primary vehicle to connect to a towed trailer. Typically, a conventional hitch ball is mounted at the distal end of the insert (which may include a "dropped" portion). In order to connect to a towed trailer, a mounting ball on a receiver hitch insert must be aligned with the counterpart receiver on the hitch of the trailer. Typically, this requires backing up the primary vehicle to the trailer with the assistance of a spotter providing directions, or moving the trailer to the primary vehicle, where the trailer is of sufficiently light weight.

Because of the difficulties encountered in aligning the ball to the hitch unassisted, there have been numerous hitch designs that attempt to provide some adjustment capability to reduce the level of precision needed for alignment. However, these types of hitches typically are limited to a single type of connection, or utilize parts that require adjacent exposed metal structures to side directly against one another. Over time, these can rust and stick reducing the effectiveness of the hitch.

A receiver hitch system that allowed for easier adjustment and longer useful life would be an improvement in the art, Such a system that allowed for multiple types of adjustments and connections in a single system would be a further improvement in the art.

SUMMARY

The present invention includes an adjustable receiver hitch system including a slide member that may be installed in a receiver tube attached to a vehicle, extending therethough. Near the distal end of the slide member is disposed a rotationally pivotable bearing assembly. Interchangeable connection ends may be attached to the bearing assembly and are used to connect to a towed trailer. One interchangeable end may feature a height adjustment capability, while others may have fixed vertical heights. The system allows a user to adjust the attachment portion of the hitch in multiple ways to connect to a towed trailer to allow for attachment without an exact alignment between the primary vehicle and the trailer.

DESCRIPTION OF THE DRAWINGS

It will be appreciated by those of ordinary skill in the art that the various drawings are for illustrative purposes only. The nature of the present invention, as well as other embodiments of the present invention, may be more clearly understood by reference to the following detailed description of the invention, to the appended claims, and to the several drawings.

DETAILED DESCRIPTION

Figure 1:
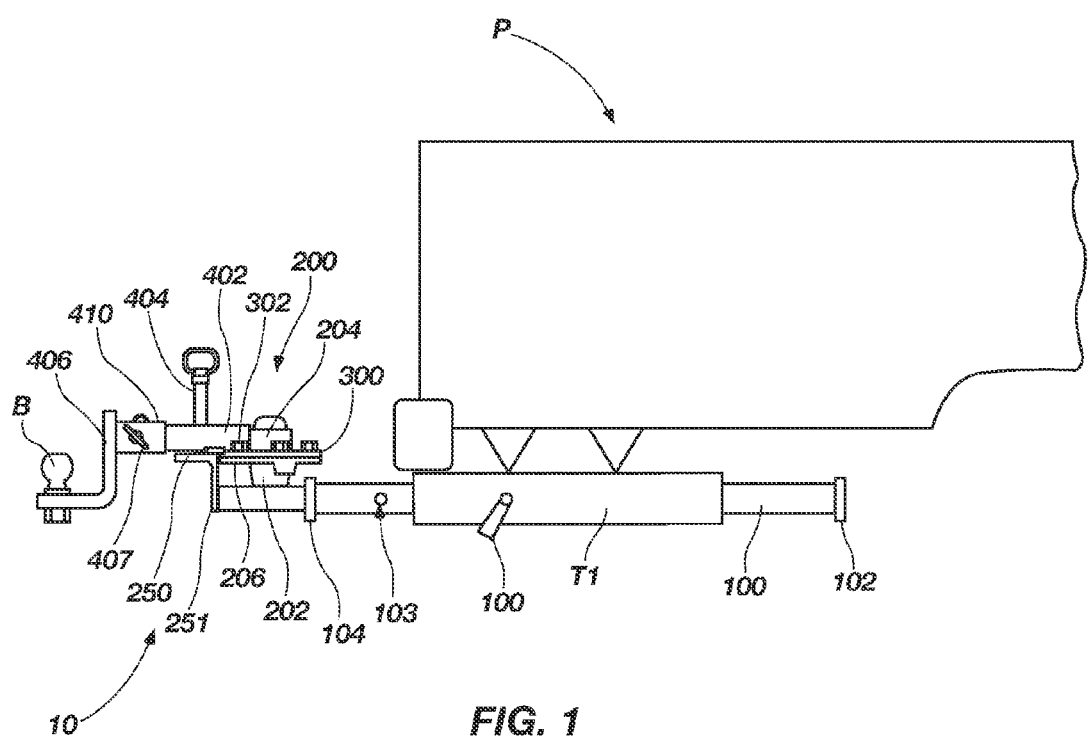
FIG. 1 is a side view of an adjustable receiver hitch system in accordance with one aspect of the present invention, installed in a receiver tube on a tow vehicle.
Figure 1A:
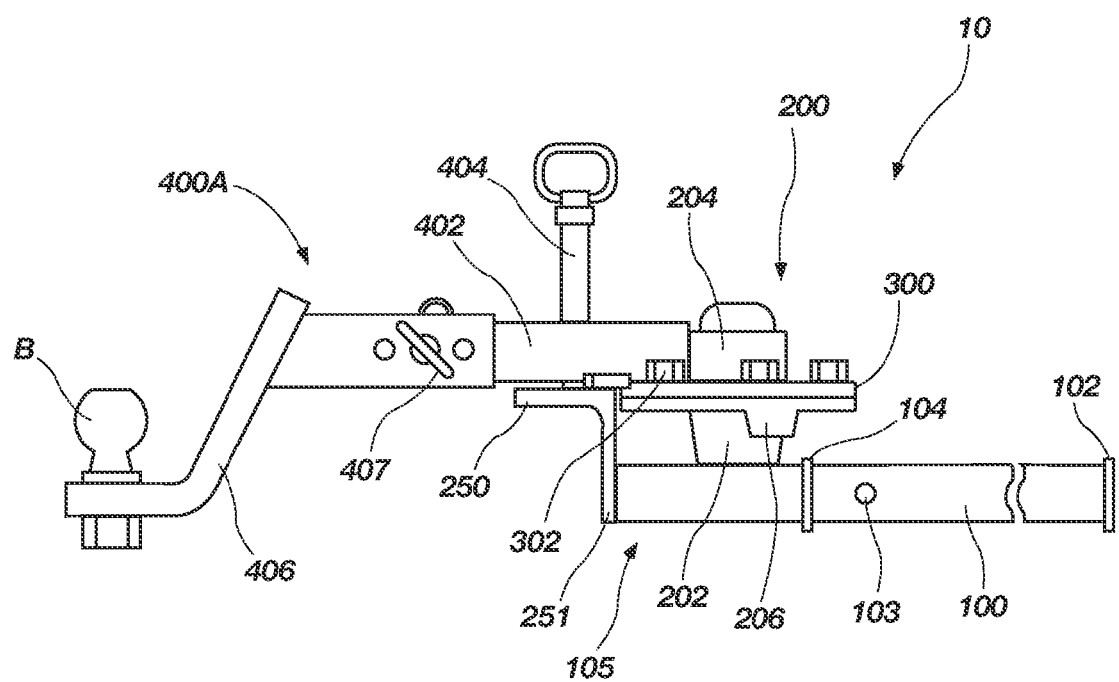
FIG. 1A is a side view of an adjustable receiver hitch system of FIG. 1 in isolation.

The present invention relates to apparatus, systems and method for adjustable receiver hitches. It will be appreciated by those skilled in the art that the embodiments herein described, while illustrating certain embodiments, are not intended to so limit the invention or the scope of the appended claims. Those skilled in the art will also understand that various combinations or modifications of the embodiments presented herein can be made without departing from the scope of the invention. All such alternate embodiments are within the scope of the present invention.

Referring to FIGS. 1 through 6, one embodiment of an adjustable receiver hitch system 10 in accordance with the principles of the present invention is depicted. Beginning a proximal end thereof (in relation to the primary vehicle), a slide member 100 extends from proximal end to a distal connection end 105 as a solid metal bar. The slide member 100 is sized and configured for slidable placement in a receiver tube T1 disposed at the rear of a primary vehicle P. As depicted, the receiver tube T1 and slide member 100 may have square cross-sectional shapes. A first collar 102 may be removably disposed at the proximal end of the slide member 100 as a cap or lip which has a cross-sectional diameter wider than the bore of receiver tube T1 to prevent inadvertent removal of the slide portion from the receiver tube. One or more holes 103 may pass through the slide member 100 allowing it to be secured in the receiver tube by placement of a rod therethrough at a desired location.

A second collar 104 may be disposed on the slide member 100 distal to the hole(s) 103 and proximal to the connection end 105, as a lip or bead formed thereon having a cross-sectional shape wider than the bore of receiver tube T1 to limit the distance the slide remember 100 may be inserted therein. This can prevent inadvertent damage to a primary vehicle from the remainder of the system 10 structure.

On the top surface of the connection end portion of the slide member 100, a bearing hub assembly 200 is mounted. The bearing hub assembly includes a lower portion 202, which may be formed as a "neck" attached to the upper surface of the tube 100, and to the bottom of a bearing assembly 204, formed as a pintle and surrounding collar covered by a cap (best depicted in FIG. 3A) which is disposed on the neck. A hub plate 206, which may have a round shape when viewed from above and thicker sections for structural reinforcement extends from the collar and includes a number of upwardly extending threaded shafts 208.

A connection plate 300 may be attached to the collar. As depicted, the connection plate 300 may include a series of holes corresponding to the threaded shafts 208, through which the shafts 208 may be inserted. Lug nuts 302 may be secured on the threaded shafts to secure the connection plate 300 in to the collar. A connection end 400 may then extend distally from the connection plate, as discussed further herein.

Distal to the bearing hub assembly, a locking plate 250 is disposed at the distal end of the tube 100. The locking plate 250 may be disposed atop a member 251 (FIG. 4) attached to the distal end of slide member 100. Upon attachment, a connection end 400 extends distally over locking plate 250 and includes a locking hole 252 and stops 254 at each medial end for preventing unwanted over-rotation of the connection end.

Figure 2:
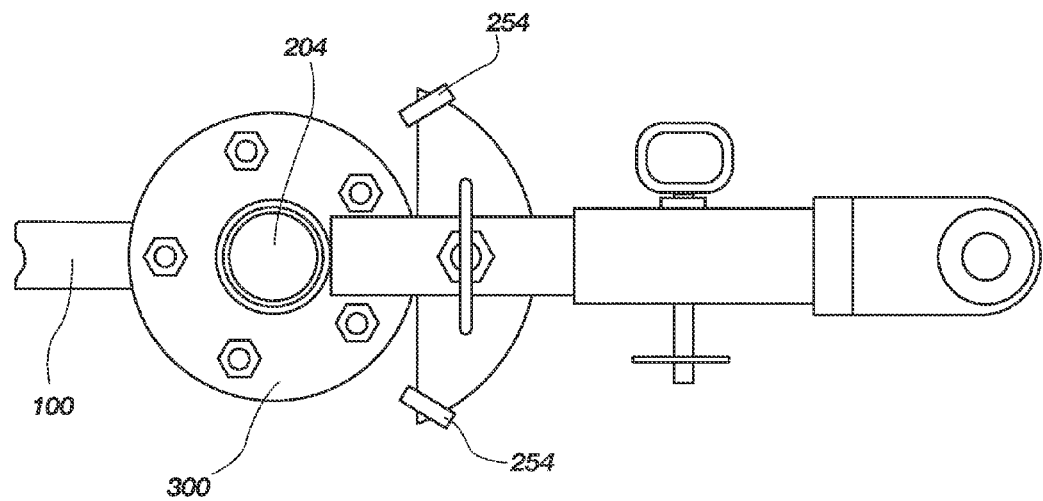
FIG. 2 is a top view of the receiver hitch system of the present invention FIGS. 1 and 1A.
Figure 3:
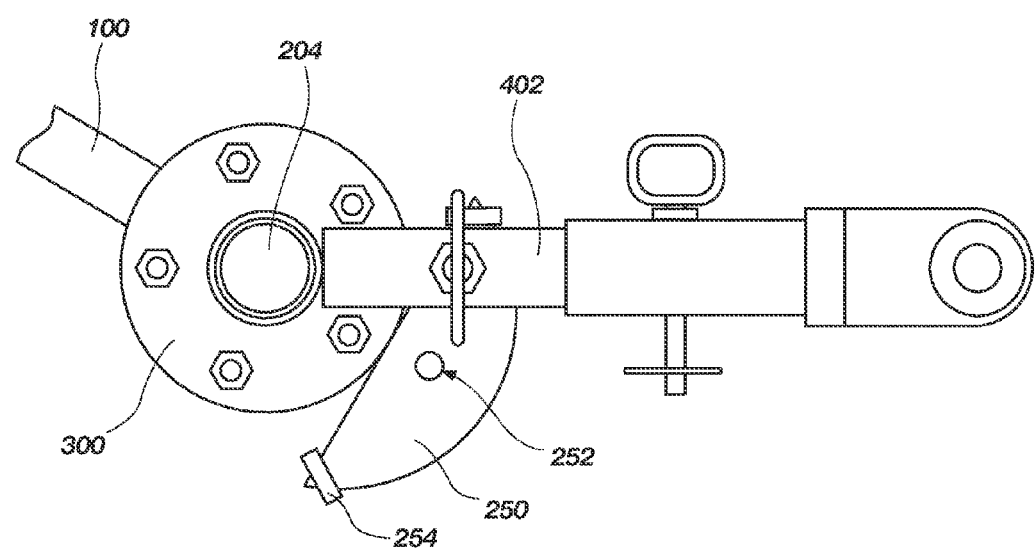
FIG. 3 is a top view of a rear portion of the system of FIGS. 1 through 2.
Figure 3A:
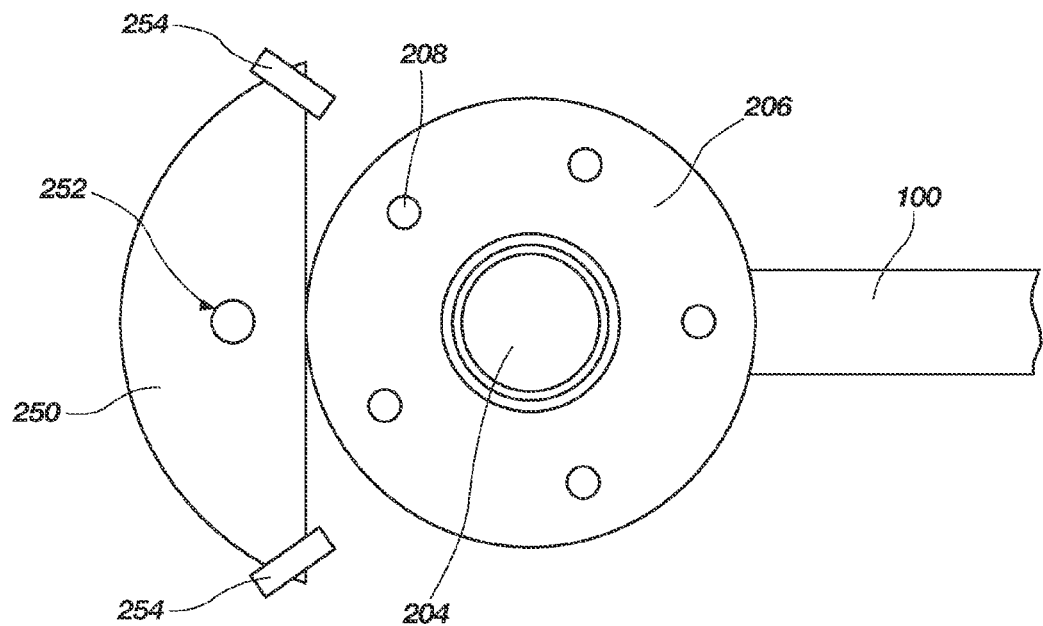
FIG. 3A is a top view of a rear portion of the system of FIGS. 1 through 2 with a connection end removed.

Connection end 400A depicted in FIGS. 1 through 3, has a first connection member 402 extending distally from the connection plate 300, to which the bottom surface thereof is attached. In the depicted embodiment, the connection member 402 extends distally over the locking plate 250 to a distal end and is a solid bar having a square cross-sectional shape. A retractable pin 404 extends through the connection member 402 to interact with the locking hole 252.

One or more holes may extend laterally through the connection member 402 allowing a rod 407 to be inserted therethrough. As depicted, a drop hitch end 406 with a ball B may be mounted on connection member 402 by placing the connection tube portion thereof 410 slidably onto the connection member 402 and securing thereon for towing with rod 407.

Figure 4:
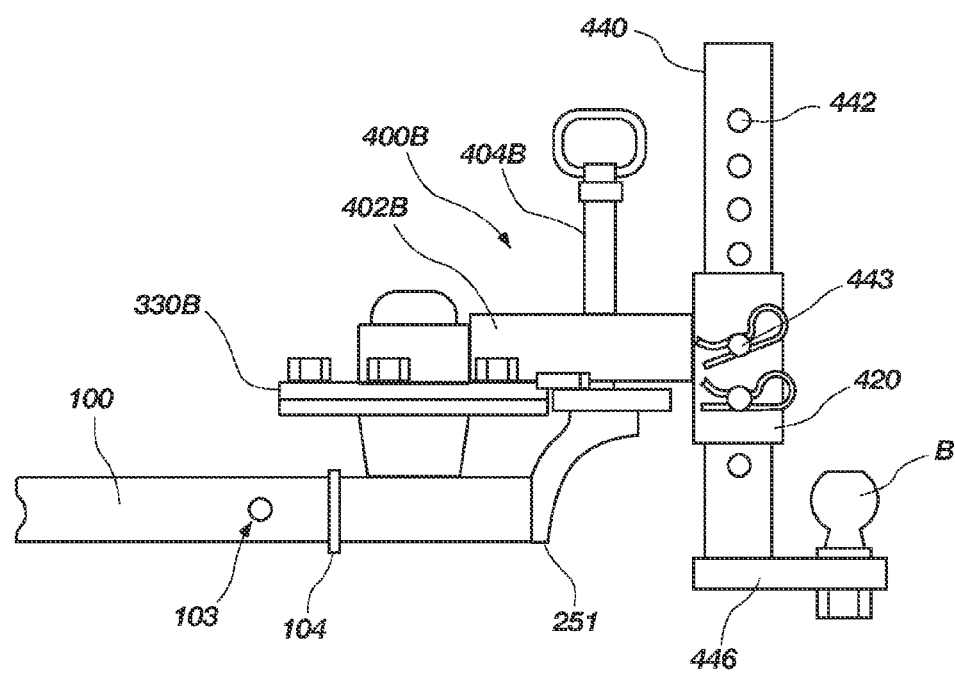
FIGS. 4, 5 and 6 are side, opposite side, and top perspective views of the rear portion of the system of FIGS. 1 through 3A with an alternate interchangeable connection end installed.
Figure 5:
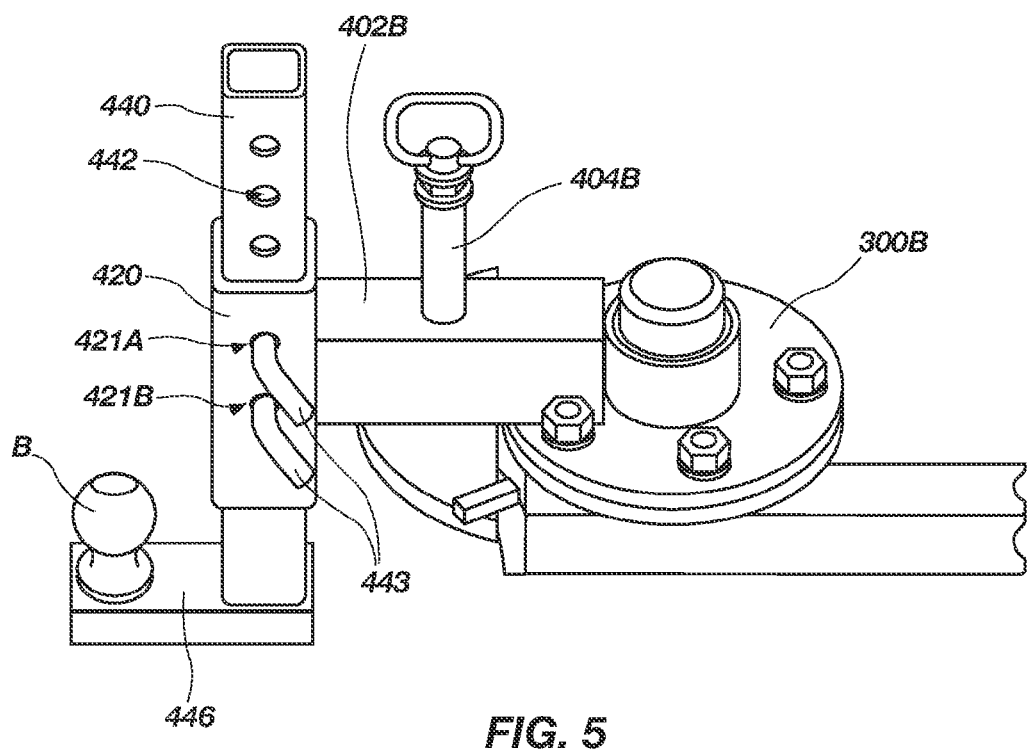
Figure 6:
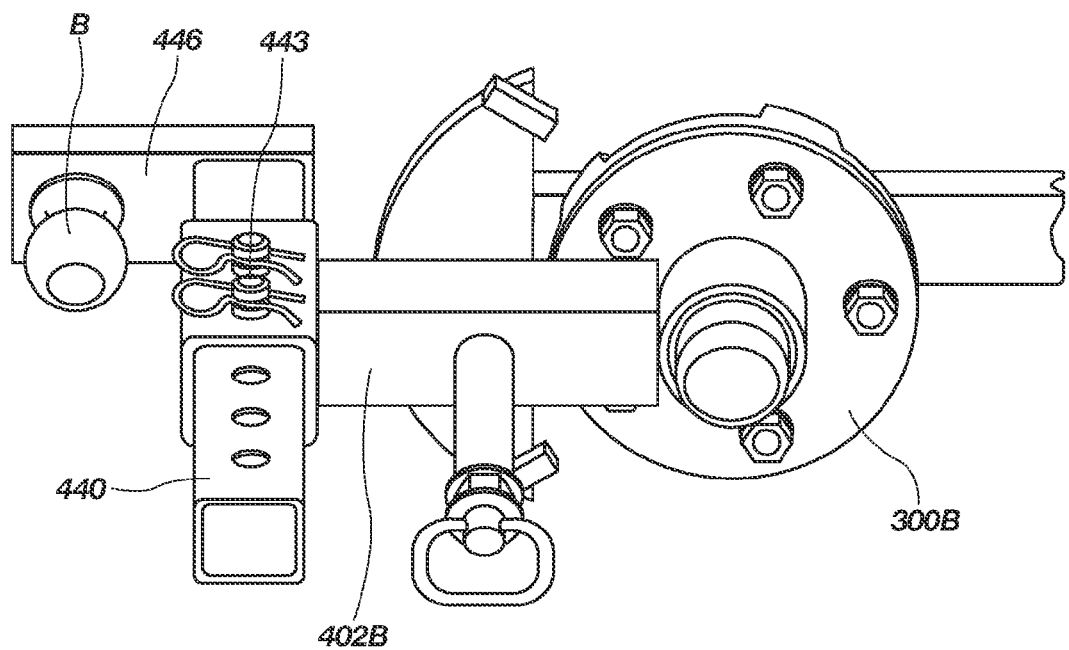

The alternate connection end 400B depicted in FIGS. 4, 5, and 6 has a first connection member 402B extending distally from the connection plate 300B, to which the bottom surface thereof is attached. In the depicted embodiment, the connection member 402B extends distally over the locking plate 250 to a height adjustment receiving tube 420 at the distal end. A retractable pin 404B extends through the connection member 402 to interact with the locking hole 252.

Height adjustment receiving tube 420 has a bore running in a vertical direction and aligned locking holes 421A and 421B in the opposite sides thereof. Height adjustment bar 440 is a member sized to fit in the bore of the tube 420, extending vertically therethough, which is placed in the tube 420. As depicted both height adjustment receiving tube 420 and height adjustment bar 440 may have square cross-sectional shapes.

A plurality of receiving holes 442 allow the bar 440 to be secured at different selected heights in the height adjustment receiving tube 420 by rods 443 placed though the locking holes 421A and/or 421B and the desired receiving holes 442. A hitch mounting plate 446 is secured to the bottom of height adjustment bar 440 and extends distally therefrom to support a mounting ball B or other hitch connection (such as a hook or pin).

It will be appreciated that interchangeable connection ends 400A and 400B may be connected and disconnected to the system 10 by either the connection plate 300 and nuts (as depicted with connection end 400B), or by a "quick-connect" feature on a connection member 402 (as depicted with connection end 400A) depending on the particular application and desire of the user.

In use, a user places a system 10 in a receiver tube T1 on a primary vehicle and reverses the vehicle near a trailer to be towed. A precise alignment during the movement of the vehicle is not needed. The user is then able to adjust the system 10 by extending or retracting the slide member 100 in the receiver tube to adjust for differences in the horizontal distance between the trailer and the primary vehicle. Similarly, by pivoting the connection end 400A or 400B using the bearing hub assembly 200, lateral distances between the trailer and the primary vehicle may be adjusted. Finally, where a connection end 400B is used, a user may adjust the height of the mounting plate 446 by moving height adjustment receiving bar 440 to a desired position in height adjustment tube 420 and securing it therein to bring a ball B on the mounting plate 446 to the correct height to connect with a ball socket on the corresponding trailer hitch. The trailer may then be moved to place the system 10 in position to lock the various components in place.

While this invention has been described in certain embodiments, the present invention can be further modified with the spirit and scope of this disclosure. This application is therefore intended to cover any variations, uses, or adaptations of the invention using its general principles. Further, this application is intended to cover such departures from the present disclosure as come within known or customary practices in the art to which this invention pertains and which fall within the limits of the appended claims.

What is claimed is:

1. An adjustable receiver hitch system for insertion in a receiver tube on a tow vehicle, comprising:
   a slide member formed as a bar for installation in the receiver tube, extending therethrough, such that a proximal end thereof extends past a first end of the receiver tube and a distal portion of the slide member is disposed behind the receiver tube;
   a bearing hub assembly disposed at the distal end of the slide member, the bearing hub assembly including a lower hub plate which can be rotated, and a connection plate attached to an upper surface of the hub plate; and
   a connection end attached to the connection plate, comprising a connection member and a ball for connecting to a receiver on a trailer hitch.

2. The adjustable receiver hitch system of claim 1, wherein the connection end further comprises a height adjustment tube, formed as a generally vertical tube, and a height adjustment bar disposed in a bore of the height adjustment tube and retained at a selected height therein by at least one rod inserted through a first set of parallel retaining holes in the height adjustment tube and a hole in the height adjustment bar, and the connection member is attached to bottom of the height adjustment bar.

3. The adjustable receiver hitch system of claim 2, wherein the height adjustment bar is retained in the bore of the height adjustment tube at the selected height by a second rod inserted through a second set of parallel retaining holes in the height adjustment tube and a second hole in the height adjustment bar.

4. The adjustable receiver hitch system of claim 2, wherein the connection end is removably attached to the connection plate.

5. The adjustable receiver hitch system of claim 4, wherein the connection end is removably attached to the connection plate by a quick connect receiver disposed on the connection plate.

6. The adjustable receiver hitch system of claim 1, wherein the slide member further comprises a removable cap on the proximal end thereof to prevent inadvertent removal from the receiver tube.

7. The adjustable receiver hitch system of claim 1 wherein the slide member further comprises at least two holes formed therethrough for the insertion of a rod through parallel holes in the receiver tube to retain the slide member at a desired position in the receiver tube.

8. The adjustable receiver hitch system of claim 1, further comprising a locking plate disposed distal to the bearing hub assembly, on a support extending from the distal end of the slide member, the locking plate comprising a generally planar member which contains a locking hole for receiving a locking pin extending from the connection member to thereby prevent rotation of the connection member.

9. An adjustable receiver hitch system for insertion in a receiver tube on a tow vehicle, comprising:
   slide member formed as a bar for installation in the receiver tube, extending therethrough, such that a proximal end thereof extends past a first end of the receiver tube and a distal portion of the slide member is disposed behind the receiver tube;
   a bearing hub assembly disposed near a distal end of the slide member; and
   connection end attached to the bearing hub assembly, the connection end comprising
   a height adjustment tube, formed as a generally vertical tube, and a height adjustment bar disposed in a bore of the height adjustment tube and retained at a selected height therein by at least one rod inserted through a first set of parallel retaining holes n the height adjustment tube and a hole in the height adjustment bar, and a connection member attached to bottom of the height adjustment bar, the connection member including a replaceable structure for connecting to a receiver on a trailer hitch.

10. The adjustable receiver hitch system of claim 9, wherein the replaceable structure for connecting to a receiver on a trailer hitch comprises a tow ball.

11. The adjustable receiver hitch system of claim 9, wherein the height adjustment bar is retained in the bore of the height adjustment tube at the selected height by a second rod inserted through a second set of parallel retaining holes in the height adjustment tube and a second hole in the height adjustment bar.

12. The adjustabe receiver hitch system of claim 9, wherein the bearing hub assembly comprises a rotating hub plate 13. The adjustable receiver hitch system of claim 12, wherein the connection end is attached to an upper surface of a connection plate attached to the hub plate.

14. The adjustable receiver hitch system of claim 13, wherein the connection end is removably attached to the bearing assembly.

15. The adjustable receiver hitch system of claim 14, wherein the connection end is removably attached to the connection plate by a quick connect receiver disposed on the connection plate.

16. The adjustable receiver hitch system of claim 9, wherein the slide member further comprises a removable cap on the proximal end thereof to prevent inadvertent removal from the receiver tube.

17. The adjustable receiver hitch system of claim 9, wherein the slide member further comprises at least two holes formed therethrough for the insertion of a rod through parallel holes in the receiver tube to retain the slide member at a desired position in the receiver tube.

18. The adjustable receiver hitch system of claim 17, wherein the slide member further comprises a ridge formed distal to the at least two holes formed therethrough to limit the insertion of the slide member into the receiver tube.

19. The adjustable receiver hitch system of claim 9, further comprising a locking plate disposed distal to the bearing hub assembly, on a support extending from the distal end of the slide member, the locking plate comprising a generally planar member which contains a locking hole for receiving a locking pin extending from the connection member to thereby prevent rotation of the connection member.

20. The adjustable receiver hitch system of claim 19, wherein the a locking plate further comprises stops formed as ridges along the opposite edges thereof which extend upwards to contact the connection member when rotated thereto, to restrain rotation of the connection member to an arc defined by the locking plate.

* * * * *